United States Patent [19]

Williams et al.

[11] Patent Number: 4,835,071
[45] Date of Patent: May 30, 1989

[54] THIN METAL ELECTRODE FOR AMTEC

[75] Inventors: Roger M. Williams, Azuza, Calif.; Bob L. Wheeler, Houston, Tex.; Barbara Jefferies-Nakamura, San Marino; James L. Lamb, San Dimas; C. Perry Bankston, Studio City; Terry Cole, La Canada, all of Calif.

[73] Assignee: California Institute of Technology, Pasadena, Calif.

[21] Appl. No.: 82,890

[22] Filed: Aug. 6, 1987

[51] Int. Cl.$^4$ .................. H01M 6/36; H01M 10/44
[52] U.S. Cl. ........................... 429/11; 429/50; 429/104; 429/112
[58] Field of Search ............... 429/11, 104, 112, 50

[56] References Cited

U.S. PATENT DOCUMENTS

3,732,195  1/1976  Evans et al. .................. 429/104
4,175,164  11/1979 Cole ............................. 429/11
4,452,777  6/1984  Abrams et al. ................ 429/104
4,675,257  6/1987  Winchester ................... 429/112

Primary Examiner—Stephen J. Kalafut
Attorney, Agent, or Firm—Marvin E. Jacobs

[57] ABSTRACT

An electrode having higher power output is formed of a thin, porous film (less than 1 micrometer) applied to a beta-alumina solid electrolyte (BASE). The electrode includes an open grid, current collector such as a series of thin, parallel, grid lines applied to the thin film and a plurality of cross-members such as loop of metal wire surrounding the BASE tube. The loops are electrically connected by a bus wire. The overall impedance of the electrode considering both the contributions from the bulk BASE and the porous electrode BASE interface is low, about 0.5 OHM/cm$^2$ and power densities of over 0.3 watt/cm$^2$ for extended periods.

17 Claims, 5 Drawing Sheets

THIN METAL ELECTRODE FOR AMTEC

ORIGIN OF THE INVENTION

The invention described herein was made in the performance of work under a NASA contract, and is subject to the provisions of Public Law 96-517 (35 USC 202) in which the Contractor has elected to retain title.

DESCRIPTION

1. Technical Field

The present invention relates to highly efficient thermoelectric conversion devices and, more particularly, this invention relates to improved thin electrodes for an alkali metal thermoelectric converter (AMTEC).

2. Background of the Invention

New types of primary energy sources are needed to power electronic devices, electric vehicles and to smooth peak power demands on electric utilities. Promising devices for electrochemical energy conversion are based on the direct conversion of heat energy to electrical energy without use of moving mechanical parts.

Direct conversion of heat energy to electrical energy has both aesthetic and practical appeal. Several devices for thermoelectric direct conversion have been developed. The Seebeck effect, thermionic, and magnetohydrodynamic generators are familiar examples. None of these direct converters has been widely adopted because of practical problems such as parasitic heat loss or lack of a critical material with the physical properties necessary for high efficiency and good durability.

Among the less well known direct thermoelectric converters are the thermally regenerative electrochemical systems (TRES). These devices are closed electrochemical cells that produce electrical power. The reactants for these cells are regenerated within the device by thermal energy from a heat source from which heat flows through the device to a heat sink. TRES have also been called electrochemical heat engines, by analogy with the well-known heat engines in which a working fluid is carried around a thermodynamic cycle. Many types of TRES were investigated in the 1950's and 1960's in the search for improved methods of converting the thermal output of nuclear reactors to electrical power.

All of the early TRES were plagued by practical problems such as inefficient heat exchange, electrode polarization, slow chemical regeneration kinetics, materials separation problems, and corrosion. Power densities of these early systems were usually limited to a few tens of milliwatts per square centimeter of electrode area, and thermoelectric efficiencies were below five percent.

A thermally powered sodium concentration cell based on a unique solid electrolyte was developed in 1968. This led to the development of the alkali metal thermoelectric converter (AMTEC) which is the first TRES with efficiency and power density comparable to conventional heat engines.

The alkali metal thermoelectric converter (AMTEC) is a device for the direct conversion of heat to electrical energy. The sodium ion conductor, beta-alumina, is used to form a high-temperature regenerative concentration cell for elemental sodium. An AMTEC can operate with an efficiency of 20 to 40 percent, a power density of 0.5 kilowatt per kilogram or more, while having no moving parts, low maintenance requirements, and high durability. Efficiency is independent of size. AMTEC devices should be usable with high-temperature combustion, nuclear, or solar heat sources. A wide range of applications from aerospace power to utility plants appears possible.

Improved power density from an AMTEC device was achieved by coating the beta-alumina with a 1-5 micrometer thick porous layer of a transition metal such as molybdenum. As disclosed in U.S. Pat. No. 4,175,164, the layer had good conductivity at the high temperature experienced in the device. Liquid sodium molybdate formed which facilitated sodium transport, as ions, through the porous electrode. However, only about 70 to 80 percent of theoretical efficiency was achieved and a two- to five-fold reduction in specific power output and efficient were experienced after 10-1000 hours of operation. The voltage drop was related to electrode degradation. The flow resistance of sodium increased as sodium molybdate evaporated and less efficient gas diffusion of sodium through pores became the dominant transport process (3). The electrode was not capable of extended operation at high power levels. Many applications require operation of an AMTEC cell with porous electrodes at high specific power for periods of 10,000 hours or more.

Thus, the only remaining fundamental limitation of AMTEC devices is the provision of a long life (more than 10,000 hours) electrode with a negligible contribution to the internal impedance of the device.

Electrodes thinner than 1 micrometer would minimize the pressure difference across the electrode film and thus reduce sodium vapor transport resistance in the porous metallic film. However, very thin films present an increased sheet resistance that provides an excessive impedance to the AMTEC cell.

STATEMENT OF THE INVENTION

An improved electrode for AMTEC devices having fast sodium transport with low electronic resistance is provided in accordance with the invention. AMTEC devices, including the electrode of the invention, exhibit power densities of over 0.3 watt/cm$^2$ for sustained periods.

The electrode of the invention achieves these desirable properties and results by applying a thin current collection grid to a thin, porous film (less than 1 micrometer thick) of a refractory metal which is insoluble in sodium or in any liquid phase which may form.

The thin film is formed of an early transition, refractory metal selected from Groups IVB, VB, VIB of the Periodic Table such as Mo, W, Nb or Ta which all resist sodium dissolution. Refractory metals are those metals that melt or evaporate at a temperature above the maximum operating temperature of the cell, usually above 1500 K.

These and many other features and advantages of the invention will become apparent as the invention becomes better understood by reference to the following description.

List of Cited References

| U.S. Pat. No. | Patentee |
| --- | --- |
| 3,458,356 | J. T. Kummer et al |
| 3,481,787 | O. J. Adlhart |
| 3,563,730 | Richardo O. Bach et al |
| 3,930,888 | George C. Bowser et al |
| 4,042,757 | Ivor W. Jones |
| 4,049,877 | Robert B. Saillant et al |

-continued

| U.S. Pat. No. | Patentee |
|---|---|
| 4,080,489 | Arabinda N. Dey |
| 4,098,959 | Max Bettman |
| 4,175,164 | Terry Cole |
| 4,452,777 | Abraham et al |
| 4,505,991 | Neill Weber |
| 4,510,210 | Thomas K. Hunt |
| 4,547,442 | Jurgen O. Besenhard et al |

Literature

1. C. P. Bankston, T. Cole, R. Jones, and R. Ewell, J. Enegy, 7, 442 (1983).
2. C. P. Bankston, T. Cole, S. K. Khanna, and A. P. Thakoor, in "Space Nuclear Power Systems 1984," Vol. II, p. 393, M. S. El-Genk and M. D. Hoover, Editors, Orbit Book Co., Malabar, FL (1985).
3. R. M. Williams, G. Nagasubramanian, S. K. Khanna, C. P. Bankston, A. P. Thakoor, and T. Cole, J. Electrochem. Soc., 133, 1587 (1986).
4. R. M. Williams, C. P. Bankston, S. K. Khanna, and T. Cole, J. Electrochem. Soc., 133, 2253 (1986).

Discussion of the Prior References

These patents do not disclose an electrode for an AMTEC device formed of a combination of a fine grid applied to a thin electrode film of an early transition, refractory metal. The Cole, Jones and Saillant patents disclose the use of thick porous molybdenum or tungsten electrode film on a beta-alumina solid electrolyte (BASE) in an AMTEC cell. Weber discloses use of platinum on an AMTEC converter. Besenhard et al shows use of a lithium-molybdenum alloy in a battery to achieve good electrical contact. Adlhart relates to a fuel cell utilizing a catalytic Raney alloy anode comprising platinum and zirconium, rhenium or tungsten. Dey uses platinum to bond lithium to a stainless steel current collector. The remaining references relate to corrosion of tantalum. The remaining references relate to various structural or operational improvements in AMTEC cells.

DETAILED DESCRIPTION OF THE INVENTION

Figure 1:
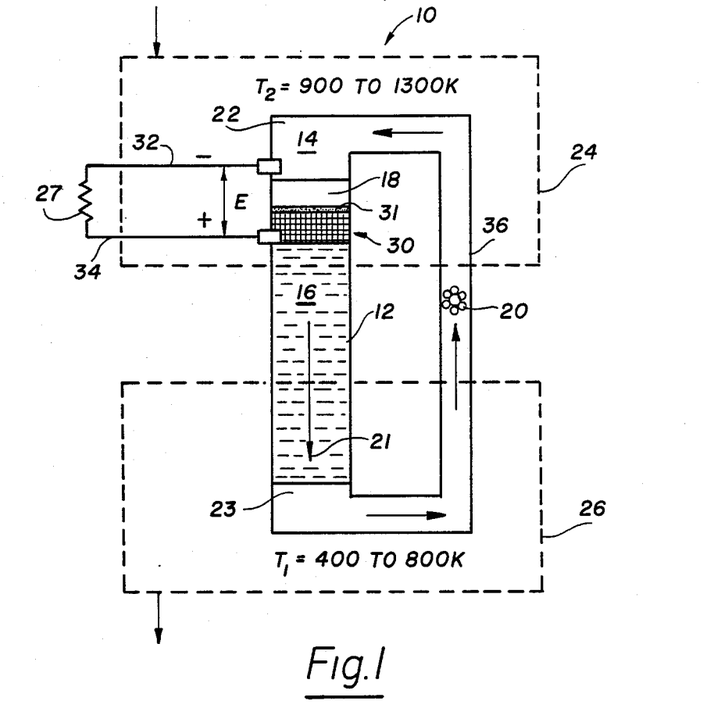
FIG. 1 is a schematic diagram illustrating the thermodynamic cycle of an AMTEC device containing the electrode of the invention.

The operating cycle of an AMTEC device 10 is illustrated diagrammatically in FIG. 1. A closed vessel 12 is divided into two regions 14, 16 by a separator 18 of BASE and an electrode 30 comprising a thin film 31 of refractory metal covered by an open current collector 33. Liquid sodium 22 fills the upper region 14 which is maintained at a temperature $T_2$ in the range of 900 to 1300 K. by an external heat source 24. In this temperature range the vapor pressure of sodium is 0.05 to 2.5 atm ($5.0 \times 10^3$ to $2.5 \times 10^5$ Pa). The lower region 16 containing mostly low pressure sodium vapor 21 and a small amount of liquid sodium 23, is in contact with a heat sink condenser 26 at $T_1$ in the range of 400 to 800 K. which produces a sodium vapor pressure range of $10^{-9}$ to $10^{-2}$ atm ($10^{-4}$ to $10^3$ Pa). The metal electrode 30 covers the low-pressure side of the BASE separator 18. Electrical leads 32, 34 are connected to the electrode 30 and to the high temperature liquid sodium 22. The leads 32, 34 exit through the wall of the device and connect to a load 27. Nearly all of the temperature drop across the AMTEC occurs in the low-pressure vapor space 16. An electromagnetic pump 20 recirculates the sodium working fluid through the liquid return tube 36 of the AMTEC to complete the cycle. Other methods of recirculation are also possible, especially with vapor-fed cells.

At the beginning of the AMTEC cycle, sodium at temperature $T_1$ from the condenser 26 enters the hot zone and absorbs externally supplied thermal energy from the heat source 24 until the sodium reaches $T_2$. The temperature-generated pressure (chemical potential) differential across the BASE forces $Na^+$ ions in the solid toward the low-pressure surface. Since BASE will conduct sodium only as $Na^+$ ions, the reaction.

Na(liquid)→electron+[Na$^+$] BASE occurs at the liquid sodium-BASE interface when sodium flows. The symbol [Na$^+$] BASE indicates a sodium ion in the conduction plane of beta-alumina. At open circuit, Na$^+$ ions are driven by thermal kinetic energy toward the low-pressure BASE surface, causing this surface to acquire a net positive charge. The electrical field in the BASE builds up until it is strong enough to stop the flow of Na$^+$.

Figure 2:
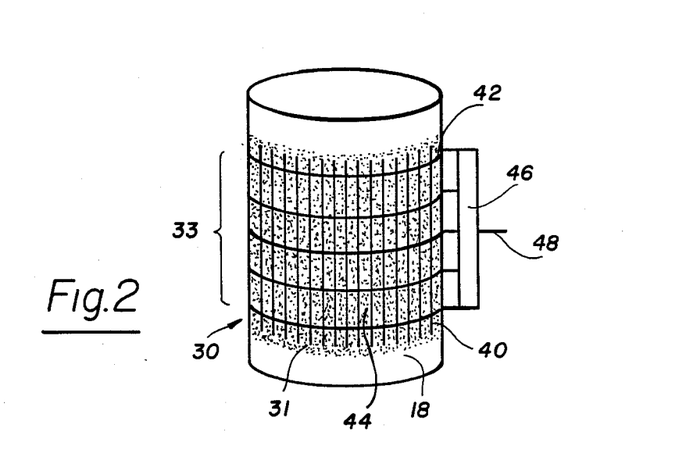
FIG. 2 is a schematic perspective diagram of the AMTEC electrode of the invention.

Referring now to FIG. 2, the composite, thin film-grid electrode of the invention is illustrated. The BASE separator 18 has an upstream side and a thin film-grid electrode 30 on the downstream side of the BASE separator. The thin film 31 of the electrode 30 during operation of the AMTEC contains pores. Sodium 22 traverses the BASE separator 18 as ions and the electrode film 31 in a condensed phase. It is converted to a gas as it leaves the electrode film 31 and flows through the openings 35 in the grid 33 into the vapor space 16. The rapid sodium mobility on the surface of, or through, the thin film makes possible the highly efficient and sustained operation of the AMTEC cell.

Beta-alumina and beta"-alumina or their mixtures are members of the class of materials known as solid electrolytes or fast ion conductors. These materials have ionic conductivities much larger than their electronic conductivities and thus act as permselective barriers. Beta"-alumina solid electrolyte (BASE) has a much higher soidum conductivity than Beta-alumina and is a transparent crystalline solid melting at 2253 K., having the nominal composition $Na_{5/3}Li_{1/3}Al_{32/3}O_{17}$ and is usually fabricated as a dense microcrystalline sintered ceramic. It is inert to reaction with elemental sodium at temperatures as high as 1300 K. Its Na$^+$ conductivity at 1000 K. is 0.7 ohm$^{-1}$cm$^{-1}$.

The solid electrolyte can assume different configurations such as a flat barrier film or the solid electrolyte can be provided in cylindrical form. The surface can be planar or corrugated. The solid electrolyte is usually fairly thin, typically having a thickness from 0.01 to 0.2 cm, generally around 0.1 cm. In a real device, the electrodes on the solid electrolyte would completely cover the outside surface of the solid electrolyte.

Figure 3:
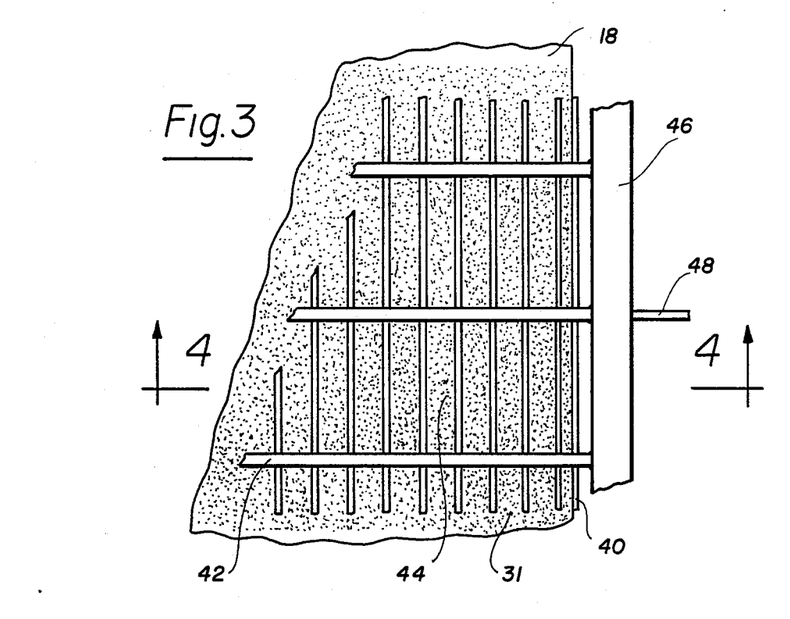
FIG. 3 is a view in section taken along line 3—3 of FIG. 2.

Referring now to FIGS. 2 and 3, the electrode 30 comprises a thin film 31 applied to the surface of a BASE separator 18 shown in cylindrical form. The film has a thickness below 1 micrometer, generally less than 0.5 micrometers, preferably from 0.1 to 0.6 micrometers. The film is preferably formed of molybdenum or tungsten with a porosity from 5 to 40% usually from 15 to 25%. The film is preferably applied by vapor deposition under on under vacuum. Magnetron sputter application of molybdenum or tungsten vapor deposits a porous film showing columnar morphology with clumps of metal clusters forming the columns with cracks between the clusters.

The grid 33 is a thin, metal current collector having at least 20% open area, preferably from 60 to 80%, and contacting no more than 10–20% of the electrode film surface area, so that there is minimum flow impedance to the sodium vapor. The grid can be formed by vapor deposition techniques, by wrapping metal wires, strips or metal mesh around the BASE tube, or by a combination of these techniques.

The grid 33 illustrated in FIGS. 2-3 is formed by applying axial strips 40 of molybdenum or other metal to the thin film 31. The axial grid lines 40 could also be formed by vapor deposition either by writing the lines by means of a collimated metal vapor source or by applying a photolithographic mask and depositing the lines through openings in the mask. The grid lines are electrically connected to the load 27 by connectors which intersect the grid lines. The connector can be a helical connector or can be formed by means of wrapping or a plurality of loop connectors 42 around the tube. At least two connectors are provided, one near the top and one near the bottom edges of the grid lines 40. Preferably the connectors 42 are evenly spaced to form a matrix of rectangular openings 44. The tie wires connect to a bus wire 46 having a terminal 48. The grid strips can be held in place by mechanical contact. It is preferred to braze these elements to the thin electrode film and to each other to improve mechanical integrity and to provide lower impedance contact.

The current collector can be formed of any good conductor that has a melting point above about 1500 K., the maximum temperature of operation of an AMTEC. The metal used to form the grid may be the same or different than the thin film. The use of the same metal may reduce stress and separations since the film and the grid will have the same degree of expansion with temperature.

The grid lines are thin to reduce impedance and to provide maximum exposed surface of the thin electrode film to the sodium gas. The grid lines are preferably no more than 0.001 cm in diameter and can be as small as the resolution capability of photolithographic or metal vapor writing techniques. The grid lines are thinner as the film thickness is reduced. Generally the grid lines should be at least $10 \times 10^{-5}$ cm in diameter to provide adequate conductivity, and to insure stability to morphology changes brought about by sintering.

The spacing between the lines is wide enough to provide with the tie lines at least 20% open space. The spacing between lines is at least the thickness of the lines and is preferably at least 3 times the thickness of the lines. The tie lines can be much thicker than the grid lines since the tie lines also serve to lock the grid lines on the BASE tube and do not directly contact the surface of the film. The tie lines can be from 0.001 to 1.0 in thickness, usually about 0.01 to 0.1 cm in thickness. At least two tie lines are utilized, one near the top and one near the bottom of the grid lines. A plurality of tie lines are preferably utilized to provide a lower impedance and to mechanically bind the grid lines to the tubes at a plurality of intersections. The tie line spacing can be much wider than the grid lines. The tie line spacing is 1 to 5 times the grid spacing, usually about 4–6 times the grid spacing. The tie lines can be the same or different high temperature melting metals as the grid lines. Again, use of the same metal reduces stress on expansion of the grid assembly during operation of the AMTEC device. The bus wire can be fairly thick such as from 0.05 to 0.5 cm thick wire. The strips, tie wires and bus wires can be covered with brazing powder which fuses and flows to weld the assembly together and connect it to the thin electrode film.

Experimental

Very thin Mo and W porous metallic electrodes were formed by magnetron sputtering from cylindrical targets under a pressure of 5 to 12 millitorr argon, onto a rotating masked BASE tube (Ceramatec, Inc., 15 mm O.D., 1.2 mm wall, 300 mm long, lithia-stabilized sodium beta"-alumina). The base pressure of the sputtering system is typically $2.5 \times 10^{-6}$ torr, no bias or heating of the substrate is used, and the deposition rate is usually 14 Å/s. BASE tubes are kept under vacuum or in an argon filled glove-box at all times before the experiments, except during transfers and wiring of electrode contacts to the feedthroughs. BASE tubes are evacuated for twelve to sixteen hours in the sputtering system prior to porous electrode deposition.

A grid as illustrated in FIG. 2 was formed by laying thin (0.13 mm) Mo wire strips, cut to the length of the Mo electrodes on the tube. The strips were held in place by tying thicker Mo wires (0.5 mm diameter) around the tube in at least four places. The distance between the thin wires was approximately 0.5 mm. A current and voltage probe was tied onto the electrode at the center with 0.5 mm Mo wire. The length of the electrodes was 0.8 to 1.6 cm. Since the BASE tube has a diameter of 1.5 cm, the electrode areas were approximately 4.2 to 8.5 cm$^2$. In some cases, the Mo grids were brazed to the electrodes by coating the Mo wires with a braze powder/cement slurry before they were tied on, and then by brazing as described previously.

Current collector grids for the W electrode were constructed of a single cylindrical wrapping of expanded nickel mesh (1.27 mm $\times$ 0.72 mm) diamond grid mesh, original thickness 0.227 mm, Delker Corp.) which was tied in place by loops of 0.5 mm Mo wire separated from each other by about 1.0 mm. Since nickel has a linear thermal expansion coefficient, in K$^{-1}$, ($13.3 \times 10^{-6}$) substantially greater than those of BASE ($7.4 \times 10^{-6}$), Mo ($5.4 \times 10^6$), and W ($4.5 \times 10^{-6}$), the nickel grid bonded strongly and permanently to both the electrode and tie-wires on heating to AMTEC operation temperature. Sheet resistance measurements and voltage profiles were obtained on other electrodes which had a current-voltage lead pair to each of 2 or 4 brazed 0.5 mm Mo wire contact loops. The current was supplied with a power supply (Kepco model JOE 15-6 MVP, Flushing, NY) and monitored with a digital multimeter. The voltage was measured with a digital multifunction meter. Voltage profiles were obtained on these electrodes by discharging the electrode through one contact while monitoring the voltage at each of the four contacts.

Small patch and ring electrodes with areas of 0.3 to 1.3 cm$^2$ were used for ac impedence measurements. However, ac impedence data of larger electrodes were obtained in some instances.

Current interrupt measurements were carried out by establishing a steady-state current in an electrode and then triggering a fast FET switch with a voltage pulse, to interrupt the steady-state current flow. The voltage of the electrode was monitored with a Nicolet digital oscilloscope. The immediate voltage change corresponds to the total ohmic voltage drop within the cell. The remaining voltage difference, with respect to open circuit, is due to concentration polarization and capacitance.

The experiments and equipment used to obtain other data have been described in detail previously. (1, 2, 3, 4)

Results and Discussion

A compilation of sheet resistance measurements is given in Table I for various thicknesses of MO and W electrodes, both at room temperature and at AMTEC operating temperatures.

TABLE 1

Typical sheet resistances observed for porous, columnar, magnetron sputtered Mo and W films on cylindrical BASE substrates.
Four-probe measurements do not include contact resistance, two-probe measurements include contact resistance.

| Nominal Thickness (um) | Sheet Resistance at 300K Ohms/square | Sheet Resistance at AMTEC Operating Conditions 1000-1200K Ohms/square |
|---|---|---|
| Molybdenum Electrodes | | |
| 0.15 | 62.2 four-probe | 90,000 four-probe |
| 0.30 | 2.65 four-probe | 4,000 four-probe |
| 0.45 | 2.67 two-probe | 5.9 two-probe |
| 0.5 | 1.38 four-probe | |
| 0.6 | 1.12 four-probe | 60 four-probe |
| 1.0 | 0.282 four-probe | |
| 1.4 | 0.263 four-probe | 0.98 four-probe |
| 2.5 | 0.34 two-probe | 0.42 two-probe |
| Tungsten Electrodes | | |
| 0.5 | 2.10 four-probe | 6.6 four-probe |
| 1.8 | 0.60 four-probe | 1.88 four-probe |

There are some irregularities, especially among the thinner electrodes, presumably caused by minor variations in the sputtering conditions and the BASE tube surface. The two-probe measurements include the contact resistances between the probes, the braze, and the electrode. Using the data from two-probe and four-probe measurements on the same electrodes, this resistance has been calculated to be on the order of 0.1 ohm per contact. This is somewhat large and in an optimized device, it is estimated that it can be reduced by as much as one order of magnitude.

Other impedances for the device with the molybdenum grid on a 5 micrometer thick Mo electrode film are provided in the following Table 2.

TABLE 2

| | OHM/cm$^2$ |
|---|---|
| BASE Internal Impedance Tube with 0.065-0.120 cm wall thickness | 0.1-0.2 |
| Sodium flow impedance | 0.1 |
| Electronic Resistance | |
| a. Film (5 micrometers thick) | 0.06 |
| b. Grid lines (0.04 cm thick) | 0.10 |
| c. Tie Wires (0.05 cm thick) | 0.02 |
| d. Bus lines (0.127 D) | 0.07 |
| Total Impedance | 0.45-0.55 OHM/cm$^2$ |

The current-voltage curves characteristic of typical thin Mo electrodes with current collecting grids are not significantly different from those of thicker Mo sputter-deposited films. The general appearance of the current-voltage characteristic is quite insensitive to morphology or thickness of the electrode. The current and power densities of a very thin electrode without a collector grid will be smaller than those of one with a grid. With the higher sheet resistance of very thin electrodes, the area surrounding the current collector that is effectively utilized will be smaller. Therefore, a very thin electrode must have a collector grid with a characteristic grid spacing which will optimize the effective area of the electrode utilized, and the effective sheet resistance of the grid/film combination.

Figure 4:
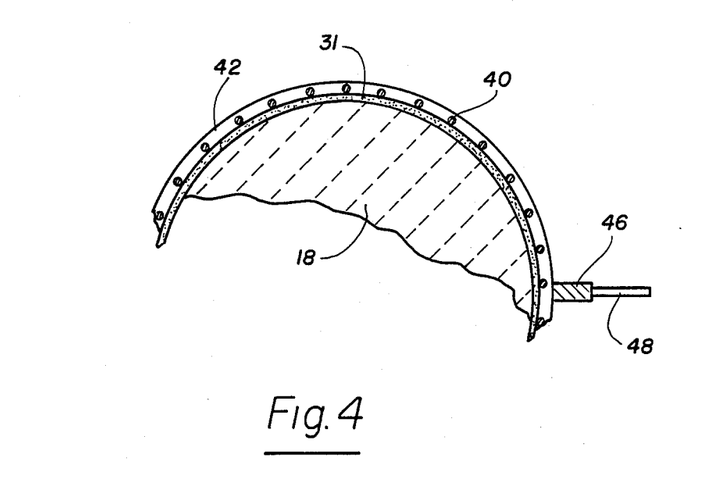
FIG. 4 is an enlarged view in elevation of a portion of the electrode shown in FIG. 2.

Higher power densities obtained with very thin Mo electrodes having collector grids are believed due to the reduced Na$^o$ vapor diffusion resistance and the collector grid off-setting the increase in electrode sheet resistance. Very thin electrodes will exhibit degradation with time that is much less dramatic than that of thicker Mo electrodes. Unlike the thicker electrodes which typically show decay in power density to 20-30% of the initial value, an 0.5 um Mo electrode had a power density of 80% of initial after almost 100 hrs. (FIG. 5), and was significantly higher in power than an otherwise similar 1.0 um Mo electrode. In FIG. 4 the power densities of 1.8 and 0.5 um W electrodes are shown with respect to time. In this case also, it is clear that thinner sputtered Mo and W electrodes with current collector grids and otherwise similar columnar morphology show superior performance. The effects of Na$_2$MoO$_4$ or Na$_2$WO$_4$ in very thin electrodes are minimized, since a) less will be present to begin with and it will be lost quickly, and b) its enhancing effect over pure sodium vapor flow will be less since the vapor flow pressure drop has been substantially reduced.

Experiments were carried out in JPL's Electrode Test Cell (ETC) for preliminary screening, fundamental measurements and initial lifetime data on different electrode compositions. The experimental procedures and equipment used to obtain data were previously described in detail by Bankston et al (1) and Williams et al (3)(4).

Figure 5:
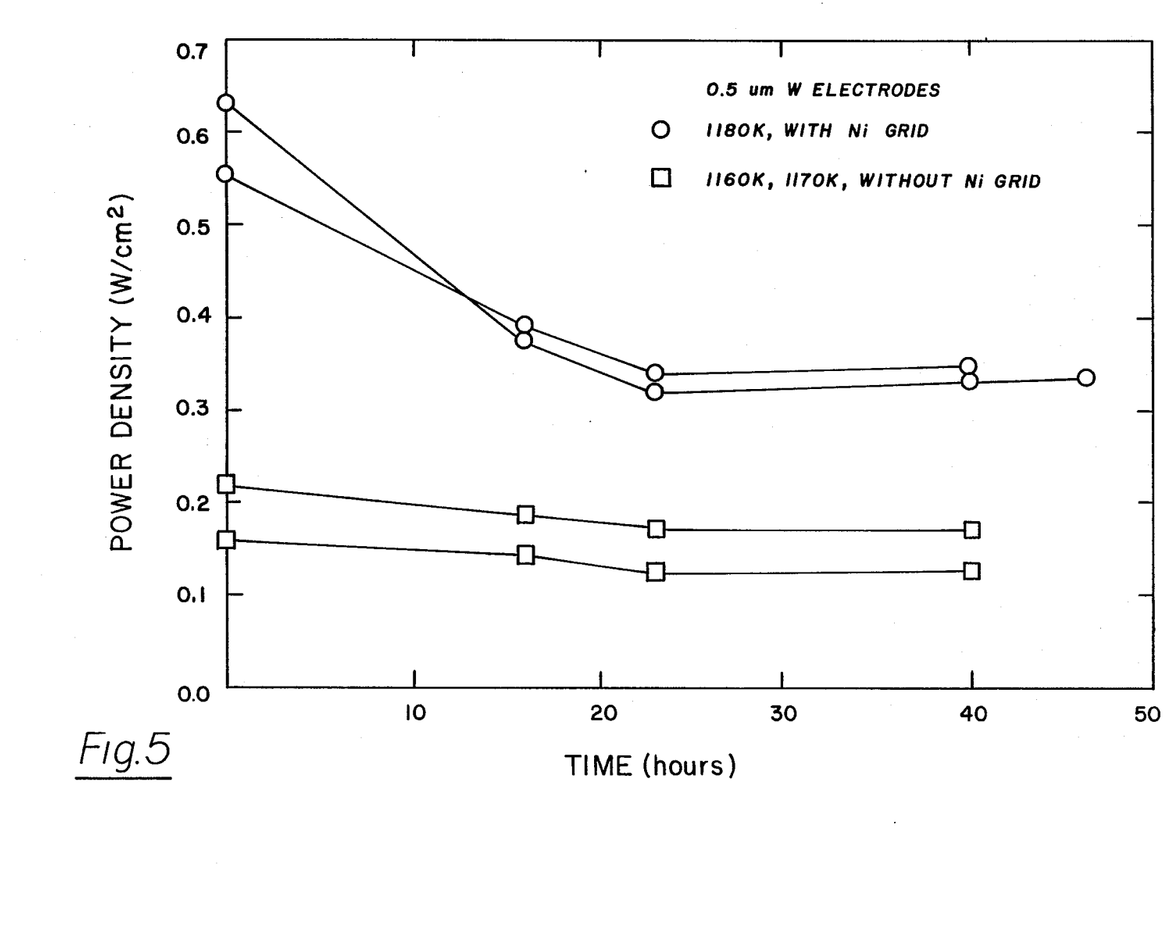
FIG. 5 is a series of curves showing a comparison of the performance of very thin tungsten electrodes with and without grids.

A comparison of tungsten electrode performance with and without a current collection grid is shown in FIG. 5. All electrode films in FIG. 5 were 0.5 um thick. The data show that the current collection grid improved the power output by 50-100%. Current collection for the electrodes without the grid was through a single turn of 0.5 mm diameter Mo wire wrapped around a 1 cm wide electrode.

Figure 6:
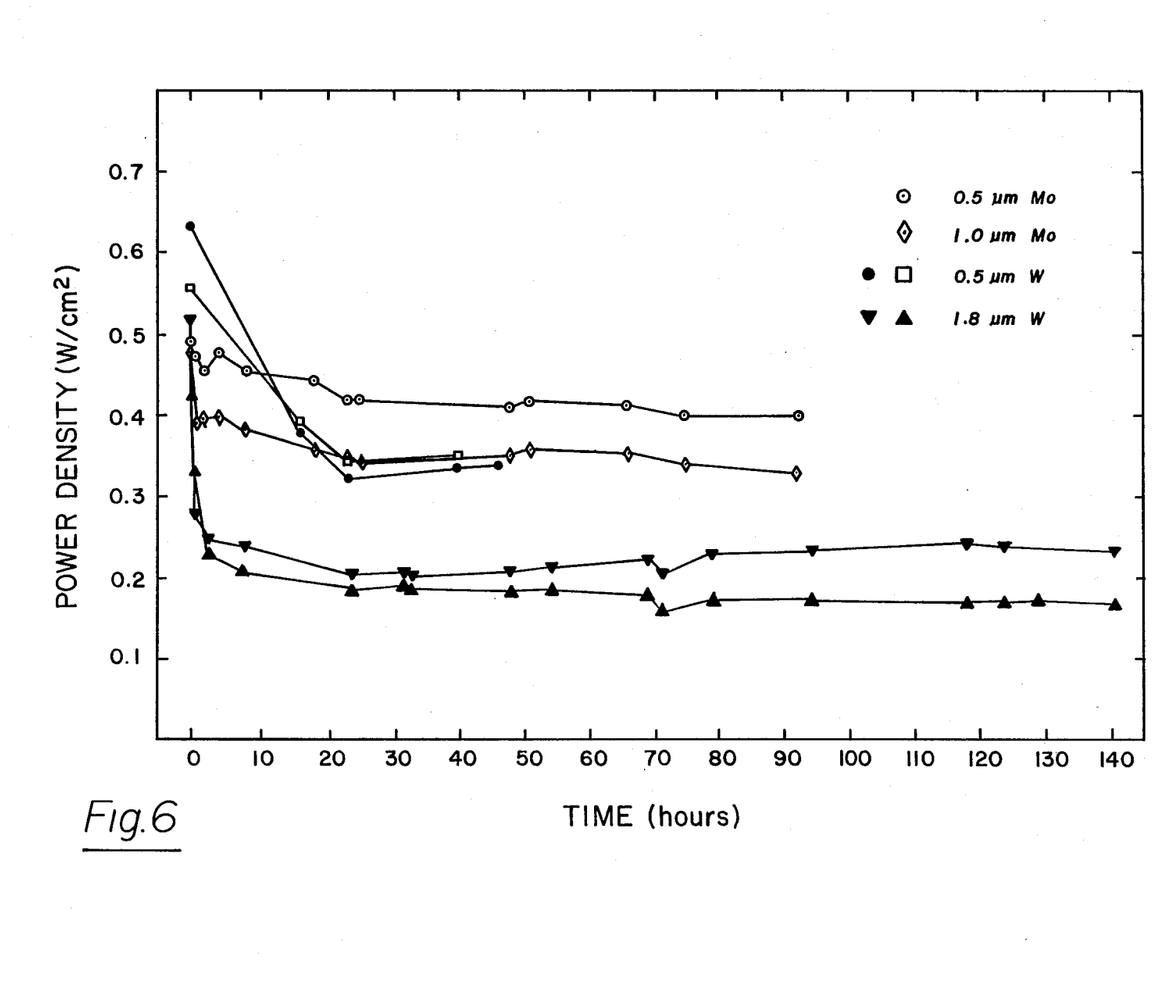
FIG. 6 is a series of curves showing a comparison of the performances of thin and thick molybdenum and tungsten thin film electrodes.

FIG. 6 shows the effect of thickness on Mo and W electrode performance. Superior electrode performance is observed for the thinner electrodes where all electrodes in FIG. 6 utilized current collection grids. Also, the Mo electrodes at 0.5 um thickness produced somewhat higher power densities than 0.5 um tungsten electrodes. Note from FIG. 6 that stable power densities were achieved following brief initial transients. These stable power densities achieved are the highest yet achieved for Mo and W electrodes. Previously, long term (100 hours or more) power densities were in the 0.1–0.3 W $cm^2$ range (see FIG. 7).

A model describing the performance of porous molybdenum and tungsten AMTEC electrodes has been formulated. The model considers an electrode element bounded by current collection grid wires. The electrode element is then divided into segments, usually more than 20, and the AMTEC voltage-current relationship is solved for each segment.

The model was first utilized to predict the voltage rise along electrodes as a function of distance from a current collector wire. The data were taken by wrapping a current collector wire around one edge of the electrode and by wrapping three voltage probe wires around the electrode at increasing distances from the current collector. These wires were also utilized to measure sheet resistance. A geometric parameter, G, was estimated from scanning electron microscopy (SEM) photographs of the three tungsten electrodes studied. The results show good agreement with model predictions in comparison to the data, especially for the thinner electrodes. The model prediction for the thickest electrode exhibited the greatest deviation from the data, but at large distances from the current collector. By integrating the current density along the electrode, calculations of power density for actual electrodes were carried out.

Very thin electrodes, less than 1.0 um, of molybdenum with overlaying grids appear to have the potential for long term, stable power densities needed for practical devices. Tungsten electrodes generally do not perform as well as molybdenum, probably due to the fact that the sputtered tungsten films tend to be less porous than the molybdenum films by approximately a factor of two. Thicker electrodes, greater than 1 um, while capable of high power performance when transport enhancing (but transient) Na-Mo-O chemical species are present (Williams et al. 1986), cannot sustain such performance once these species are lost. The thinner electrodes minimize the $\Delta P$ across the electrode and thus reduce sodium vapor transport resistance in "clean" metallic electrode films. At the same time, overlaying current collection grids offset the effect of increasing sheet resistance typically observed for thinner films.

It should be noted that the Na-Mo-O or Na-W-O species are almost always present in freshly prepared molybdenum and tungsten electrodes. Thus, their transport enhancing effects are usually initially observed, even in very thin electrodes. The result is the initial higher power transients observed in many of the performance curves of FIGS. 5 and 6. Otherwise, no other life limiting mechanisms have been observed for these electrodes.

Figure 7:
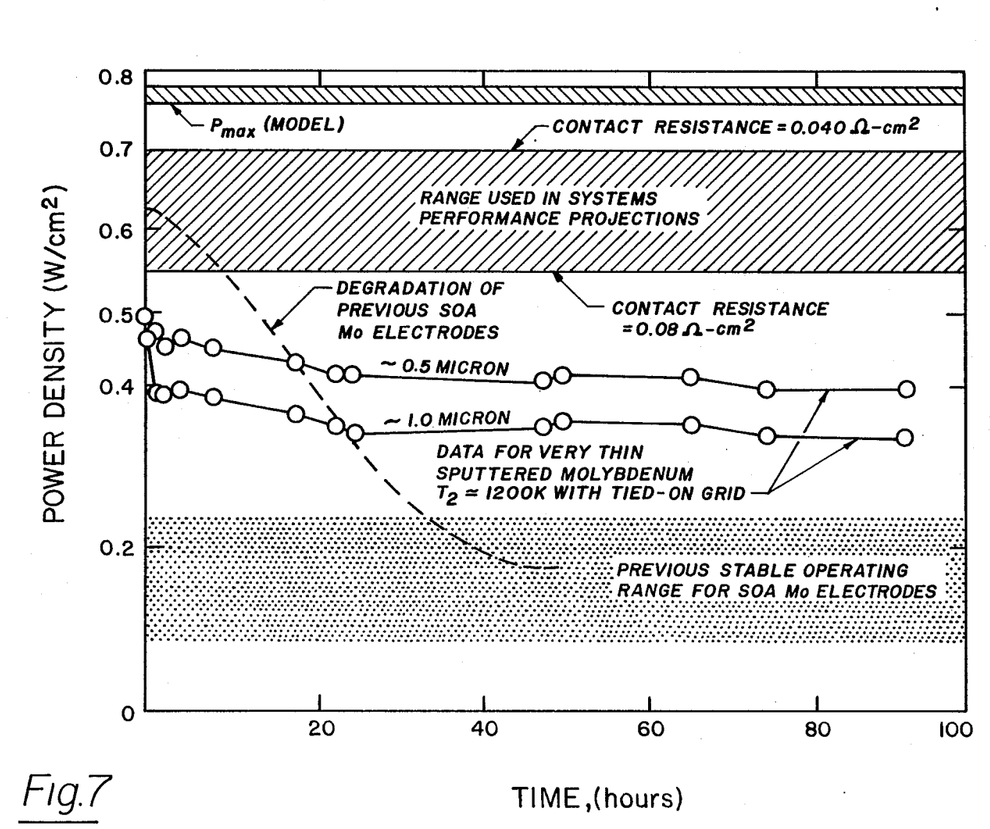
FIG. 7 is a comparison of the power density predicted for very thin molybdenum electrodes with grids.

To date, the very thin film/grid electrodes have not been optimized in the laboratory, since work on this concept is relatively recent. However, the previously described model of this system can now be used to project potential performance for optimized systems. Such model predictions show the effects of sheet resistance, geometric parameter (G), and grid spacing (d) on power density for fixed temperatures. 0.7–0.8 W/$cm^2$ appears feasible for sheet resistances of 10–20 ohm/square. All of these parameters have been demonstrated. FIG. 7 shows the effect of G and $T_2$ on power density. It appears that 1.0 W/$cm^2$ or more may eventually be feasible.

For comparison with experimental data, the effects of contact resistances are shown in FIG. 7. From model calculations, the maximum theoretical power from electrodes with the same morphology as the 0.5 um electrode tested is nearly 0.8 W/$cm^2$. The indicated contact/interfacial resistances bound the range of power densities which are now commonly used in AMTEC systems studies (see for example, Schmidt et al. 1987). Thus, the contact/interfacial resistances for the tested electrodes were greater than 0.1 OHM/$cm^2$. In order for these electrodes to reach the target range, these resistances must be reduced to 0.08 OHM/$cm^2$ or less. While contact resistances between electrodes and leads in the 0.04–0.08 OHM/$cm^2$ range have been measured in other experiments, this was not the case in the data of FIG. 7. The data shown for molybdenum in FIGS. 5 and 7 utilized the hand-wired molybdenum grids which have been found to be inferior in adhesion to expanded nickel mesh grids as disclosed in copending application entitled CURRENT COLLECTOR FOR AMTEC, filed concurrently herewith, the disclosure of which is expressly incorporated herein by reference.

An AMTEC device containing a thin film-grid electrode of the present invention exhibits low maintenance, high durability and efficiency with ability to use high-temperature combustion, nuclear or solar heat sources. The AMTEC's high specific power, simplicity, potential long life and general heat source characteristics are desirable for remote power applications such as spacecraft power sources, communication relay stations, weather buoys, military equipment, locomotives, and construction sites.

The efficiency of an AMTEC is independent of size. This recommends the AMTEC as a means for locally generating electrical power from chemical fuels in total energy systems (cogeneration). As a high temperature topping cycle for a conventional steam power plant, the AMTEC could accept input heat at 1100 to 1300 K. and produce steam at 800 K. while adding 10 to 15 percent to the plant's overall generating efficiency. As an energy converter for sodium-cooled nuclear power plants, an AMTEC energy converter would eliminate at least one heat exchanger (sodium to water) plus all high-pressure steam piping and turboalternators.

In the transportation field, the AMTEC could serve as an outboard battery charger in an AMTEC-battery hybrid electric vehicle, generating high-amperage direct current for continuous battery charging, at an efficiency comparable to a central utility from the steady-state combustion of liquid fuel on board the vehicle. Such a vehicle could have the range of a vehicle with a conventional internal combustion engine. The AMTEC could be adapted to burn any type of gaseous, liquid, or solid fuel. Emission control would be much easier for the ambient-pressure continuous combustion of the AMTEC than for the transient combustion of an internal combustion engine. The question of safety posed by the AMTEC's liquid sodium should be solvable because the amount of sodium would be small enough to protect or manage in an accident. It should be possible to build a 20-kW AMTEC with an inventory of less than 500 g of sodium.

It is to be realized that only preferred embodiments of the invention have been described and that numerous substitutions, modifications and alterations are permissible without departing from the spirit and scope of the invention as defined in the following claims.

We claim:

1. An electrode for an alkali metal thermoelectric converter comprising in combination:
   a body of solid, microcrystalline, ceramic electrolyte capable of transporting sodium ions from a first surface to a second surface;
   a thin, porous, electrode film of a metal applied to one of said surfaces, said film being non-volatile at a temperature up to 1300 K. and being formed of an early transition metal selected from Groups IVB, VB and VIB of the Periodic Table and said film having a thickness below 1 micrometer; and
   said electrode further including a metal, current collector having at least 20% open area applied to the thin metal film.

2. An electrode according to claim 1 in which the solid electrolyte is selected from beta-alumina or beta"-alumina.

3. An electrode according to claim 1 in which the film is formed by magnetron sputtering.

4. An electrode according to claim 1 in which the current collector includes a set of fine grid lines applied to the thin film.

5. An electrode according to claim 4 in which the current collector is formed of the same metal as the thin film.

6. An electrode according to claim 5 in which the current collector is brazed to the thin film.

7. An electrode according to claim 6 in which the current collector further includes a metal tie member intersecting said grid lines.

8. An electrode according to claim 6 in which the tie member included a plurality of spaced cross members applied to the grid lines.

9. An electrode according to claim 8 further including a bus bar electrically connecting the cross members.

10. An electrode according to claim 1 in which the thin film metal is selected from tungsten, molybdenum, niobium or tantalum.

11. An electrode according to claim 10 in which the thin film metal is molybdenum.

12. A method of converting thermal energy to electrical energy comprising the steps of:
    placing liquid sodium at a first temperature in contact with a first surface of a solid, microcrystalline, ceramic electrolyte,
    transporting sodium inionic form through the solid electrolyte to a second surface at lower pressure and lower temperature, said second surface having thereon a thin, porous film that is non-volatile at a temperature up to 1300 K., and is formed of a refractory metal insoluable in sodium and has a thickness below 1 micrometer and an open, current-collection metal grid applied to the thin film; and
    developing an electrical potential between said surface and said liquid sodium.

13. A method according to claim 12 in which the solid electrolyte is beta-alumina or beta"-alumina, and the metal is selected from Groups IVB, VB or VIB or the Periodic Table.

14. A method according to claim 12 in which the grid includes a series of thin, spaced grid lines.

15. A method according to claim 14 in which the grid further includes a plurality of cross members electrically joining the grid lines and a bus bar connected to the cross-members.

16. A method according to claim 12 in which the sodium leaves the second surface as a vapor and further including the steps of condensing the vapor to liquid sodium and returning the liquid sodium to said first surface.

17. A method according to claim 12 further including the steps of heating the sodium to said first temperature by transferring heat from a heat source and condensing said vapor by transferring heat from the vapor to a condenser.

* * * * *